United States Patent

[11] 3,593,276

[72] Inventor Robert K. Schuler
 Anderson, Ind.
[21] Appl. No. 745,867
[22] Filed July 18, 1968
[45] Patented July 13, 1971
[73] Assignee General Motors Corporation
 Detroit, Mich.

[54] SEQUENTIAL DIRECTION SIGNALING SYSTEM
 3 Claims, 1 Drawing Fig.
[52] U.S. Cl. .................................................. 340/67,
 307/252, 307/293, 340/82
[51] Int. Cl. .................................................. B60q 1/38
[50] Field of Search ........................................ 340/82, 67

[56] References Cited
 UNITED STATES PATENTS
3,185,961 5/1965 DuRocher .................. 340/81 F
3,398,399 8/1968 Brock ......................... 340/82
3,479,641 11/1969 Summers ..................... 340/82 X
3,484,626 12/1969 Grafham ...................... 340/82 X
3,500,312 3/1970 Stankovich .................. 340/82 X OTHER REFERENCES
Application Note 201.17, 3/66, "Sequential Turn Signal System for Automobiles," Semiconductor Products Department, General Electric Co., Syracuse, N.Y. mentioned on page 499 of SCR MANUAL, 4th Edition, 1967, Semiconductor Products, Dept., General Electric Co., Syracuse, N.Y.

Primary Examiner—John W. Caldwell
Assistant Examiner—Kenneth N. Leimer
Attorneys—Albert F. Duke, E. W. Christen and C. R. Meland ABSTRACT: A direction signal circuit including a pair of electronic timers comprising a plurality of silicon controlled rectifiers and unijunction transistor relaxation oscillators interconnected with a direction signal switch to sequentially energize a plurality of left or right signal lamps to indicate a change of direction. The timers further include a transistor responsive to concurrent actuation of the direction signal switch and a brake pedal switch for simultaneously energizing all lamps on the side of the vehicle opposite the intended turn to indicate an impending deceleration of the vehicle in contemplation of the turn. The timers are also interconnected with a hazard warning switch to simultaneously flash all of the vehicle signal lamps to indicate an emergency or hazardous condition of the vehicle.

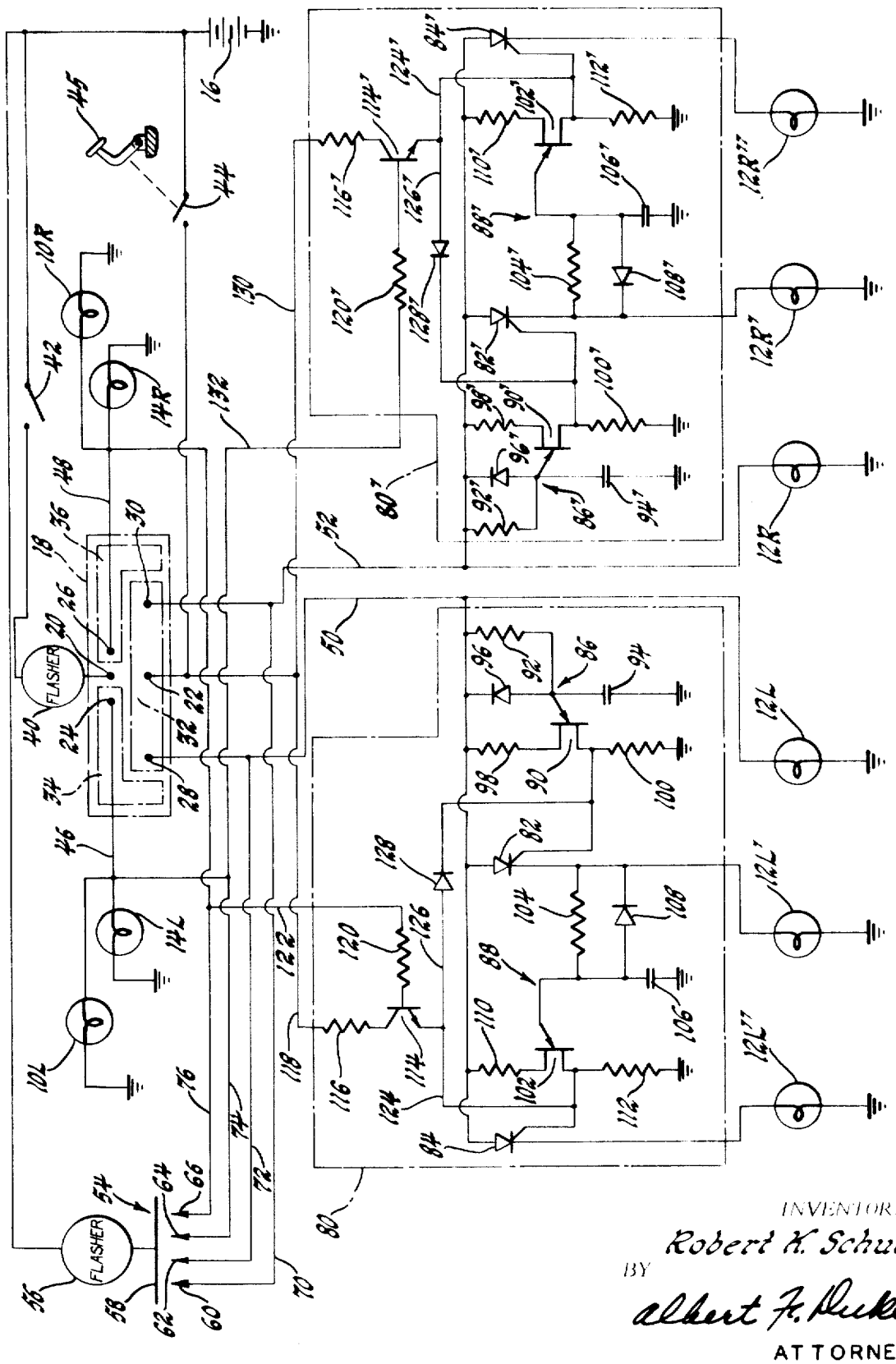

SEQUENTIAL DIRECTION SIGNALING SYSTEM

This invention relates in general to vehicle signaling systems and more particularly to a vehicle signaling system wherein a plurality of lamps may be energized in a predetermined fashion to indicate to others the status or condition of the vehicle or to indicate an impending change in vehicle operation.

Vehicle signaling systems presently in use include signal lamps mounted at the front and rear of the vehicle on the left- and right-hand sides thereof for indicating to others contemplated changes in direction or speed of the vehicle. In general, these systems include a manually operable three position direction signal switch and a flasher for selectively flashing the left front and rear or the right front and rear signal lamps. Such systems further include a stop signal switch connected with the direction signal switch to continuously energize both the rear signal lamps when the direction signal switch is in a neutral position and to continuously energize the rear signal lamp on the side opposite the intended turn when the direction signal switch is in an operating position. Presently, vehicles are also equipped with a hazard warning switch and a second flasher for simultaneously flashing all of the front and rear lamps.

It has been proposed to provide the vehicle with a plurality of left and right rear signal lamps which are sequentially energizable to indicate the impending change in vehicle direction.

One such system includes additional left and right rear signal lamps connected in parallel with the present left and right signal lamps, respectively, with the additional lamps being selectively energizable through the direction signal switch and flasher and controlled switching means which are sequentially actuable so that the appropriate left or right rear signal lamps are energized in sequence. Since in the conventional system the stop signal switch is interconnected with the direction signal switch, concurrent actuation of the stop signal switch and the direction signal switch causes the signal lamps on the side opposite the turn to go through a sequencing cycle rather than being simultaneously energized.

With the foregoing in mind, it is an object of the present invention to provide a system of the aforementioned character, including additional switching means, responsive to concurrent actuation of the direction signal switch and the stop signal switch for insuring that the lamps on the side opposite the intended turn are instantaneously, simultaneously and continuously energized.

It is another object of the present invention to provide a vehicle signaling system including separate signal lamp timing means which are energizably connected with the conventional direction signal, brake signal and hazard warning switches wherein the rear signal lamps on one side of the vehicle are sequentially energized to indicate an impending change in vehicle direction, the rear signal lamps on both sides of the vehicle are initially sequenced to indicate deceleration of the vehicle without contemplated change of direction and all the signal lamps on the vehicle are simultaneously flashed to indicate an emergency or hazardous condition of the vehicle.

In accordance with the present invention, the conventional vehicle signaling system is supplemented by additional left and right rear signal lamps which are connected in parallel with the usual left and right rear signal lamps through respective timers including a plurality of silicon controlled rectifiers (SCR) which are adapted to be triggered by unijunction transistor relaxation oscillators. The oscillators for triggering the SCR's are energized concurrently with energization of a preceding lamp so that the lamps are energized in sequence. Each of the timers for controlling the respective left and right rear signal lamps further include a transistor interconnected with the stop signal and direction signal switch for simultaneously gating all of the SCR's in the timer in response to concurrent closure of both switches. The transistor in one timer is rendered conductive in one position of the direction signal switch while the transistor in the other timer is rendered conductive in the other direction signaling positioning so that the rear lamps on the side opposite the intended turn are instantaneously and continuously energized in response to concurrent actuation of the stop and direction signaling switches. The transistors of both timers are interconnected with a hazard warning switch so as to be rendered conductive upon closure of the hazard warning switch whereby all of the rear lamps are simultaneously connected to an auxiliary flasher and are accordingly simultaneously flashed.

A more complete understanding of the present invention may be had from the following detailed description which should be read in conjunction with the single drawing which shows a schematic diagram of a preferred embodiment of the invention.

Referring now to the single drawing, the vehicle signaling system of the present invention includes left and right signal lamps 10L and 10R, respectively, mounted at the front of the vehicle and left and right signal lamps 12L and 12R, respectively, mounted at the rear of the vehicle. In addition, pilot lamps 14L and 14R are mounted within the vehicle to monitor the operation of the left and right signal lamps respectively.

A source of electrical power for energizing the aforementioned lamps is generally designated 16 and may be the usual vehicle battery. A direction signal switch generally designated 18 is connected between the aforementioned lamps and the source 16 and includes stationary input contact 20 and 22, stationary output contacts 24, 26, 28 and 30 and movable bridging contacts 32, 34 and 36. The bridging contacts 32, 34 and 36 are movable together from an illustrated neutral position to either left or right direction signaling positions by a manually actuable direction signal mechanism which automatically returns the bridging contacts to the neutral position in response to steering wheel rotation. Such a mechanism is not shown but is well known in the art. A detailed description of such a mechanism may be found in the U.S. Pat. No. 2,800,541 to Brown et al. assigned to the assignee of the present invention.

With the direction signal switch 18 in the neutral position as shown, the output contacts 28 and 30 are connected to the input contact 22 through the bridging contact 32. When the direction signal switch 18 is shifted to the left direction signaling position, the output contacts 24 and 28 are connected to the input contact 20 by the bridging contact 34. The bridging contact 32 moves out of engagement with the output contact 28 but maintains the connection between the input contact 22 and output contact 30. When the direction signal switch is moved to the right direction signaling position, the output contacts 26 and 30 are connected to the input contact 20 by the bridging contact 36. The bridging contact 32 moves out of engagement with the output contact 30 but maintains the connection between the input contact 22 and output contact 28. The input contact 20 is connected to the battery 16 through a conventional flasher 40 and a vehicle ignition switch 42 while the input contact 22 is connected to the battery 16 through a normally open stop signal switch 44.

The lamps 10L and 14L are connected to the output contact 24 through a conductor 46 while the lamps 10R and 14R are connected to the output contact 26 through a conductor 48. The lamp 12L is connected to the output contact 28 through a conductor 50 while the lamp 12R is connected to the output contact 30 through a conductor 52.

A hazard warning switch generally designated 54 is connected to the battery 16 through a conventional flasher 56. The switch 54 is illustrated as including a movable shorting bar 58 and stationary contact 60, 62, 64 and 66. The contacts 60, 62, 64 and 66 are connected to the lamps 12R, 12L and 10L and 10R through conductors 70, 72, 74 and 76, respectively.

The flasher 40 is preferably a load sensitive thermally responsive type of flasher which is normally closed and upon application of predetermined lamp load thereto will periodically open and close the circuit to the lamps. With such a flasher, burnout of one of the lamps will decrease the current flow through the flasher to a point insufficient to heat the thermally responsive element thereof. Thus, if any front or rear signal lamps should burn out the pilot lamps 14L or 14R would be continuously energized indicating to the driver that one of the left or right signal lamps, respectively, has burned out. The flasher 56 is preferably nonload sensitive so that it will continue to flash all operative lamps even though one or more signal lamps has burned out. The switch 44 is preferably actuated by applying pressure to a vehicle brake pedal designated 45.

The circuitry and components thus far described are conventional and no claim is made to such circuitry or components per se. In accordance with the present invention, additional left rear signal lamps 12L', 12L" and additional right rear signal lamps 12R', 12R" are provided and are energizable under the control of timers generally designated 80 and 80'. The timer 80 includes a pair of silicon controlled rectifiers (SCR) 82 and 84, the anode and cathode electrodes of which connect the left rear signal lamps 12L', 12L", respectively, to the conductor 50. The rectifiers 82 and 84 are normally in a nonconductive state and will remain so until triggered by the application of a predetermined voltage to the gate electrodes thereof. After the rectifiers 82 and 84 are rendered conductive, they will remain so until the circuit through the anode and cathode electrodes is broken whereupon the rectifiers return to a nonconductive state. Time delay trigger means illustrated as relaxation oscillators generally designated 86 and 88 are provided for triggering the SCR's 82 and 84 in sequence. The oscillator 86 includes a unijunction transistor (UJT) 90 which has its emitter connected to the junction of a timing network including a resistor 92, a capacitor 94 and a unidirectional conducting device such as a semiconductor diode 96. One base of the UJT 90 is connected to the conductor 50 through a resistor 98 while the other base of the UJT 90 is connected to ground through a resistor 100. The oscillator 88 similarly includes a UJT 102 having its emitter connected to a junction of a timing network including a resistor 104, a capacitor 106 and a semiconductor diode 108. The two bases of the UJT 102 are connected respectively to the conductor 50 through a resistor 110 and to ground through a resistor 112. The timing network for the UJT 102 is connected to the conductor 50 through the anode and cathode electrodes of the SCR 82. Thus, the capacitor 106 does not begin to charge through the resistor 104 until the SCR 82 is rendered conductive. The timer 80 further includes a transistor 114 of NPN-type conductivity which has its collector electrode connected through a resistor 116 and a conductor 118 to the stop signal switch 44 as well as to the hazard warning switch 54 through the contacts 22, 28, 30 and 32 and the conductors 70 and 72. The base electrode of the transistor 114 is connected through a resistor 120 and a conductor 122 to a junction between the right front signal lamp 10R and the output contact 26 of the switch 18 as well as to the hazard warning switch 54 through the conductor 76. The emitter electrode of the transistor 114 is connected directly to the gate electrode of the SCR 84 by a conductor 124 and is connected to the gate electrode of the SCR 82 by a conductor 126 through a semiconductor diode 128. The diode 128 isolates the gate electrode of the SCR 84 from the output of the UJT 90.

The timer 80' is identical with the timer 80 and corresponding elements have been designated with prime numbers. The timer 80' is connected to the conductor 52 with the SCR's 82' and 84' being connected respectively in series with the right rear lamps 12R' and 12R". The collector electrode of transistor 114' is connected to the stop signal switch by the conductor 130 and also through the conductor 130 and the contacts 22, 28, 30 and 32 and the conductors 70 and 72 to the hazard warning switch 54. The base electrode of the transistor 114' is connected to a junction between the output contact 24 and the left front lamp 10L through a conductor 132 and to the hazard warning switch 54 through the conductors 132 and 74.

OPERATION

Direction Signaling

In signaling a left turn, the movable contact 34 is moved to a position bridging the stationary contacts 20, 24 and 28 which connects the left front and rear lamps 10L and 12L to the battery 16 through the flasher 40 and the conductors 46 and 50, respectively. These lamps are thus immediately energized. At the same time, the capacitor 94 begins to charge through the resistor 92 until the voltage across the capacitor 94 reaches the peak point voltage of the UJT 90. At this point, the UJT 90 conducts, discharging the capacitor 94 through the emitter base junction of the UJT 90 and the resistor 100. This raises the voltage at the gate of SCR 82 rendering the same conductive. When the SCR 82 conducts, the lamp 12L' is connected to the flasher 40 through the conductor 50 and is thus energized. As the capacitor 94 discharges through the resistor 100, a point is reached at which the emitter of the UJT 90 ceases to conduct and the UJT turns off at which time the capacitor 94 begins to charge again. Subsequent pulses from the UJT 90 have no affect on the SCR 82 since it is already conducting. Furthermore, once the SCR 82 is conducting, turn off of the UJT 90 does not affect the SCR 82. When the SCR 82 conducts, the capacitor 106 is charged through the resistor 104 and the anode and cathode electrodes of the SCR 82. After charging to the peak point voltage, the UJT 102 turns "on" firing the SCR 84 and energizing the lamp 12L". With all four lamps 10L, 12L, 12L' and 12L" now lighted, current flow through the flasher 40 is sufficient to heat the thermal element thereof and after a predetermined interval of time the flasher 40 opens disconnecting the battery 16 from the conductors 46 and 50 and all lamps are immediately extinguished. When the flasher 40 opens, voltage is removed from the RC networks 92, 94 and 104, 106. The capacitors 94 and 106 then discharge through the diodes 96 and 108, respectively, and the lamps 12L, 12L', respectively. This insures that on the next cycle, when the flasher 40 closes, the capacitors 94 and 106 will be completely discharged. Without the diodes 96 and 108, it is possible for the capacitors 94 and 106 to maintain some charge during the period of time that the flasher 40 is open so that upon closure of the flasher 40 the lamps 12L' and 12L" will be turned on at a faster rate or almost simultaneously due to a partially charged condition of the capacitors 94 and 106.

With the switch 18 in the left direction signaling position, the transistors 114 and 114' are cut off since the collector electrodes of the transistors 114 and 114' are grounded through the lamp 12R. If, while a left turn is being indicated the stop signal switch 44 is closed, the battery 16 is connected to the collector of transistor 114' through the switch 44, the conductor 130 and resistor 116'. The base electrode of transistor 114' is also connected to the battery 16 through the flasher 40, the contacts 20, 24, 34 of the switch 18, conductors 46 and 132 and resistor 120. The transistor 114' is thus saturated, simultaneously triggering the SCR's 82' and 84' causing the lamps 12R' and 12R" to be energized simultaneously with the lamp 12R. While closure of the stop signal switch also connects the battery 16 to the collector electrode of transistor 114, the transistor 114 remains at cutoff since the base electrode of transistor 114 is grounded through the lamps 10R and 14R. Thus, the three lamps on the right side of the vehicle, i.e., on the side opposite the turn are energized simultaneously while the lamps on the turning side of the vehicle are sequentially energized.

To signal a right turn, the movable contact 36 is moved to a position bridging the stationary contacts 20, 26 and 30 which connects the left front and rear lamps 10R and 12R to the battery 16 through the flasher 40 and the conductors 48 and 52, respectively. These lamps are thus immediately energized. The SCR's 82' and 84' are then sequentially rendered conductive to sequentially energize the lamps 12R' and 12R" in the manner previously described in connection with a left turn.

If, while the right turn is being indicated the stop signal switch 44 is closed, the transistor 114 saturates and simultaneously triggers the SCR's 82 and 84 to simultaneously energize the lamps 12L', 12L'' with the lamp 12L. The transistor 114' remains at cutoff since in the right direction signaling position of the switch 18 the base electrode of transistor 114' is grounded through the lamps 10L and 14L.

Stop Signaling

When it is desired to indicate an impending deceleration of the vehicle with no change of direction of the vehicle being contemplated, the direction signal switch 18 will be in the neutral position and closure of the stop signal switch 44 will connect the battery 16 to both conductors 50 and 52 through the contacts 22, 28, 30 and 32. The lamps 12L and 12R are thus immediately energized and the capacitors 94, 94' begin to charge. When the capacitors 94, 94' reach the peak point voltage of the UJT's 90 and 90', respectively, the SCR's 82 and 82' are simultaneously triggered, energizing both the lamps 12L' and 12R'. The capacitors 106 and 106' now begin to charge and upon reaching the peak point voltage of the UJT's 102 and 102', the SCR's 84 and 84' are simultaneously triggered to energize lamps 12L'' and 12R''. After the initial sequencing of the lamps 12L, 12L', 12L'' and 12R, 12R', 12R'', these lamps remain continuously energized because the battery 16 is continuously connected to the conductors 50 and 52. The lamps 12L, 12L', 12L'' and 12R, 12R', 12R'' will be simultaneously deenergized upon opening of the stop signal switch 44. Since the direction signal switch 18 is in the neutral position, the base electrodes of the transistors 114, 114' are at ground potential being connected to the lamps 10R and 10L, respectively, and accordingly the transistors 114, 114' remain nonconductive.

Hazard Warning Operation

When it is desired to indicate an emergency condition of the vehicle such as when the vehicle is on the side of the road for repairs, the hazard warning switch 54 is actuated to move the bridging contact 58 into engagement with the stationary contacts 60, 62, 64 and 66, connecting the battery 16 to the lamps 10L and 10R through the flasher 56 and the conductors 74 and 76, respectively. At the same time the conductors 50 and 52 are connected to the battery 16 through the flasher 56 and the conductors 72 and 70, respectively. The collectors of transistors 114 and 114' are connected to the battery 16 through the flasher 56, the conductors 70, 72, the contacts 22, 28, 30, 32 of the switch 18, the respective conductors 118 and 130 and the resistors 116 and 116', respectively. The base electrodes of the transistors 114, 114' are also connected to the battery 16 through the flasher 56, the conductors 76, 122 and 74, 132, respectively, and the resistors 120 and 120', respectively. The transistors 114 and 114' are thus simultaneously saturated triggering the SCR's 82, 82' and 84, 84' so that all six lamps 12L, 12L', 12L'' and 12R, 12R', 12R'' as well as the front lamps 10L and 10R are simultaneously flashed by the flasher 56.

As will be appreciated from the foregoing description, the invention provides for sequential energization of a plurality of lamps on one side of the vehicle to indicate an impending change in vehicle direction while providing instantaneous and simultaneous energizing of the signal lamps on the other side of the vehicle to indicate to following drivers an impending deceleration of the vehicle in contemplation of the change of direction. Furthermore, the invention permits all signal lamps to be simultaneously flashed to indicate an emergency or hazardous condition of the vehicle.

While the invention has been shown and described herein in what is conceived to be the most practical and preferred embodiment thereof, it is recognized that departures may be made therefrom within the scope of the invention which is therefore not to be limited to the details disclosed herein. For a definition of the invention reference is made to the appended claims.

I claim:

1. A sequential turn signal circuit for a motor vehicle comprising left and right front signal lamps and first, second and third left and right rear signal lamps, a source of voltage, flasher means connected to said source, a stop signal switch connected to said source, a direction signal switch movable from a neutral position to left and right direction signaling positions, said direction signal switch connecting said first left and right rear signal lamps to said stop signal switch when in said neutral position and connecting said left front and said first left rear or said right front and said first right rear signal lamps to said flasher means when in said left or right direction signaling positions, respectively, said direction signal switch further connecting said first left or right rear signal lamp to said stop signal switch when in said right or left direction signaling position, respectively, a plurality of controlled rectifiers having anode, cathode and gate electrodes, each of said second and third left and right rear signal lamps being connected in parallel with said first left and right rear signal lamps, respectively, through the anode and cathode electrodes of respective ones of said plurality of controlled rectifiers, a plurality of oscillator means for respectively rendering said plurality of controlled rectifiers conductive through the application of the trigger potential to the gate electrodes thereof, one of said plurality of oscillator means being connected in parallel with said first left and right signal lamps, respectively, and energizable through said direction signal switch or said stop signal switch, succeeding ones of said oscillator means being energizable through the anode and cathode electrodes of respective ones of said controlled rectifiers, first and second transistors each having emitter, base and collector electrodes, the emitter and collector electrodes of said first and second transistors being connected in series between said stop signal switch and the gate electrodes of the controlled rectifiers controlling said left and right rear signal lamps, respectively, the base electrodes of said first and second transistors being connected to said right and left front signal lamps, respectively, whereby the lamps on one side of the vehicle are sequentially energized upon actuation of said direction signal switch and the signal lamps on the side opposite said one side are simultaneously energized upon subsequent actuation of said stop signal switch.

2. A sequential turn signal circuit for a motor vehicle comprising left and right front signal lamps and first, second and third left and right rear signal lamps, a source of voltage, flasher means connected to said source, a stop signal switch connected to said source, a direction signal switch movable from a neutral position to left and right direction signaling positions, said direction signal switch connecting said first left and right rear signal lamps to said stop signal switch when in said neutral position and connecting said left front and said first left rear or said right front and said first right rear signal lamps to said flasher means when in said left or right direction signaling positions, respectively, said direction signal switch further connecting said first left or right rear signal lamp to said stop signal switch when in said right or left direction signaling position, respectively, a plurality of controlled rectifiers having anode, cathode and gate electrodes, each of said second and third left and right rear signal lamps being connected in parallel with said first left and right rear signal lamps, respectively, through the anode and cathode electrodes of respective ones of said plurality of controlled rectifiers, a plurality of oscillator means for respectively rendering said plurality of controlled rectifiers conductive through the application of the trigger potential to the gate electrodes thereof, one of said plurality of oscillator means being connected in parallel with said first left and right signal lamps, respectively, and energizable through said direction signal switch or said stop signal switch, succeeding ones of said oscillator means being energizable through the anode and cathode electrodes of respective ones of said controlled rectifiers, first and second transistors each having emitter, base and collector electrodes, the emitter and collector electrodes of said first and second transistors being connected in series between said stop signal switch and the gate electrodes of the controlled rectifiers controlling said left and right rear signal lamps, respectively, the base electrodes of said first and second transistors being connected to said right and left front signal lamps, respectively, whereby the lamps on one side of the vehicle are sequentially energized upon actuation of said direction signal switch and the signal lamps on the side opposite said one side are simultaneously energized upon subsequent actuation of said stop signal switch, additional flasher means connected to said source, a hazard warning switch connecting said front signal lamps and the first of said left and right rear signal lamps to said flasher means, said hazard warning switch further connecting the collector and base electrodes of both of said first and second transistors to said additional flasher means whereby all of said signal lamps are simultaneously flashed upon actuation of said hazard warning switch.

3. A sequential turn signal circuit for a motor vehicle comprising left and right front signal lamps and first, second and third left and right rear signal lamps, a source of voltage, flasher means connected to said source, a stop signal switch connected to said source, a direction signal switch movable from a neutral position to left and right direction signaling positions, said direction signal switch connecting said first left and right rear signal lamps to said stop signal switch when in said neutral position and connecting said left front and said first left rear or said right front and said first right rear signals lamps to said flasher means when in said left or right direction signaling positions, respectively, said direction signal switch further connecting said first left or right rear signal lamp to said stop signal switch when in said right or left direction signaling position, respectively, a plurality of controlled rectifiers having anode, cathode and gate electrodes, each of said second and third left and right rear signal lamps being connected in parallel with said first left and right rear signal lamps, respectively through the anode and cathode electrodes of respective ones of said plurality of controlled rectifiers, a plurality of relaxation oscillators for sequentially rendering respective ones of said plurality of controlled rectifiers conductive through the application of the trigger potential to the gate electrodes thereof, each of said oscillators including a unijunction transistor and a timing network for controlling the conduction of said unijunction transistor, said timing network comprising a series connected resistor and capacitor, a unidirectional conducting device connected in parallel with said resistor and providing a discharge path for said capacitor independent of said resistor, one of said plurality of oscillators being connected in parallel with said first left and right signal lamps, respectively, and energizable through said direction signal switch or said stop signal switch, succeeding ones of said oscillators being energizable through the anode and cathode electrodes of respective ones of said controlled rectifiers, first and second transistors each having emitter, base and collector electrodes, the emitter and collector electrodes of said first and second transistors being connected in series between said stop signal switch and the gate electrodes of the controlled rectifiers controlling said left and right rear signal lamps, respectively, the base electrodes of said first and second transistors being connected to said right and left front signal lamps, respectively, whereby the lamps on one side of the vehicle are sequentially energized upon actuation of said direction signal switch and the signal lamps on the side opposite said one side are simultaneously energized upon subsequent actuation of said stop signal switch.